S. ROUSH.
CONTROLLER HANDLE.
APPLICATION FILED FEB. 7, 1916.
1,207,329.
Patented Dec. 5, 1916.
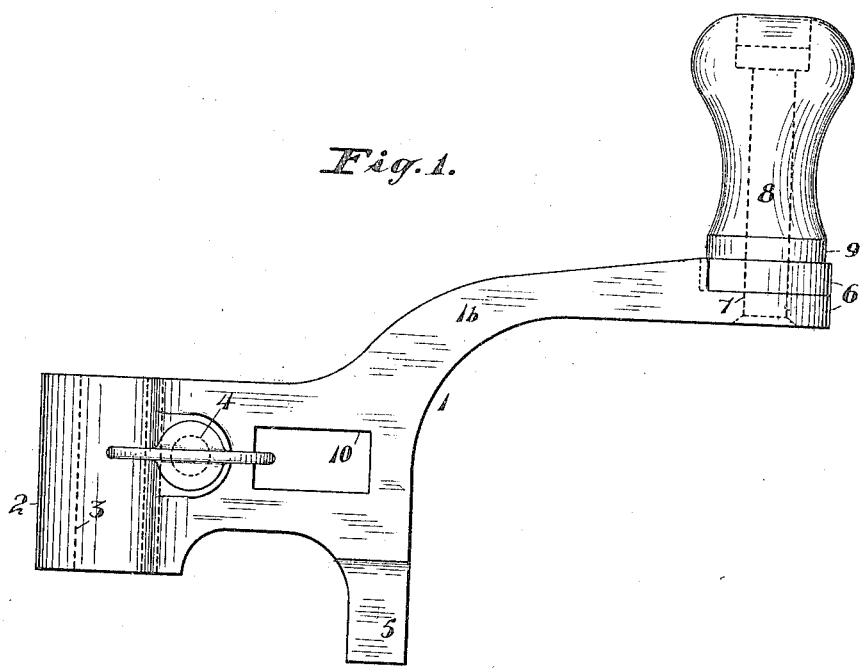
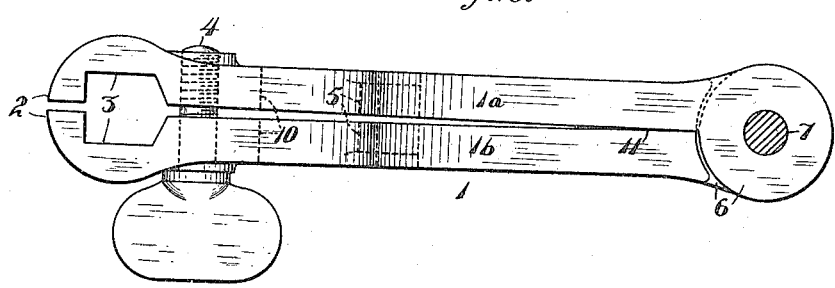
Inventor,
Squire Roush,
By F. M. Wright,
Attorney

UNITED STATES PATENT OFFICE.

SQUIRE ROUSH, OF SAN FRANCISCO, CALIFORNIA.

CONTROLLER-HANDLE.

1,207,329.

Specification of Letters Patent.

Patented Dec. 5, 1916.

Application filed February 7, 1916. Serial No. 76,821.

*To all whom it may concern:*

Be it known that I, SQUIRE ROUSH, a citizen of the United States, residing at San Francisco, in the county of San Francisco and State of California, have invented new and useful Improvements in Controller-Handles, of which the following is a specification.

The present invention relates to an improved controller handle for controlling the current supplied to electric cars, the object of the invention being to provide such a controller handle which will fit tightly on the stem of the rheostat, even after it has been worn, and thus prevent any lost motion between the controller handle and said stem.

In the accompanying drawing, Figure 1 is a side view of my improved controller handle; Fig. 2 is a plan view thereof.

Referring to the drawing, 1 indicates the main body of the controller handle, which is divided into two parts $1^a$ and $1^b$, said parts terminating in jaws 2, formed on their inner sides with recesses 3, which, when the jaws are moved sufficiently near to one another, close around the stem of the rheostat. Said jaws are brought together by means of a screw 4 passing loosely through one of said jaws and screwed into the other. Both parts of the controller handle have depending lugs 5, which, in the rotation of the controller handle about the stem of the rheostat, are adapted to abut against stops to arrest the movement of the controller handle. At the end remote from the stem, the two parts of the controller handle have overlapping apertured portions 6 registering with each other and through which passes a pivot pin 7, said pin extending upwardly to form a support for a handle 8, a ferrule 9 surrounding the bottom of the handle and the apertured parts of the controller handle. Both parts of the controller handle are cut out, as shown at 10, for the sake of lightness.

The two parts of the controller handle are so constructed that their inner sides are in contact with each other, as shown at 11, for some distance from the pivot, and then normally diverge from each other. The outer ends of the two parts, or the jaws, can be brought together by means of the screw 4, but, when the screw is unscrewed, the two jaws move apart automatically by the spring pressure against each other of the inner portions 11 of the parts of the controller handle.

I claim:—

1. A controller handle having two parts provided with means for holding them together at one end and wholly separated from each other for the remainder of their lengths on opposite sides of a central longitudinal plane, their inner sides having near the other end recesses to fit around the controller stem, and a screw passing through one of said parts and screwed into the other part adjacent to said recesses and on the sides thereof remote from said other ends for drawing the parts together around said stem.

2. A controller handle comprising two parts pivoted together at one end and separated from each other for the remainder of their lengths on opposite sides of a central longitudinal plane, their inner sides having near the other end recesses to fit around the controller stem, a screw passing through one of said parts and screwed into the other part adjacent to said recesses and on the sides thereof remote from said other ends for drawing the parts together around said stem, the pivot pin extending upwardly, and a rotary handle on said pivot pin.

3. A controller handle comprising two parts separated from each other on opposite sides of a central longitudinal plane, their inner sides having near one end recesses to fit around the controller stem, a screw passing through one of said parts and screwed into the other part for drawing the parts together around said stem, said parts at their other ends being held in contact with each other at two points spaced longitudinally from each other.

In testimony whereof I have hereunto set my hand in the presence of two subscribing witnesses.

SQUIRE ROUSH.

Witnesses:
F. M. WRIGHT,
D. B. RICHARDS.

Copies of this patent may be obtained for five cents each, by addressing the "Commissioner of Patents, Washington, D. C."